United States Patent [19]

Lentini

[11] 4,031,983

[45] June 28, 1977

[54] TIRE CHOCK

[76] Inventor: Peter S. Lentini, 623 Spruce St., Kulpmont, Pa. 17834

[22] Filed: June 14, 1976

[21] Appl. No.: 695,387

Related U.S. Application Data

[63] Continuation of Ser. No. 552,856, Feb. 25, 1975, abandoned.

[52] U.S. Cl. .................................................. 188/32
[51] Int. Cl.² ........................................... B60T 3/00
[58] Field of Search ...................... 70/225, 226, 228; 188/32, 36

[56] References Cited

UNITED STATES PATENTS

| | | | |
|---|---|---|---|
| 1,139,988 | 5/1915 | McMillan et al. | 188/32 |
| 1,370,364 | 3/1921 | Rodriguez | 188/32 UX |
| 2,844,954 | 7/1958 | Marugg | 188/32 UX |
| 3,297,111 | 1/1967 | Lisboa | 188/32 |

Primary Examiner—Duane A. Reger
Attorney, Agent, or Firm—Watson, Leavenworth, Kelton & Taggart

[57] ABSTRACT

The tire chock of the subject application is comprised of a wedge element and a frame. The wedge element prevents rolling of the tire in the direction of the chock and the frame element secures the wedge element to the tire to prevent the wedge from moving away from the tire and to prevent rotation of the tire with respect to the wedge.

11 Claims, 3 Drawing Figures

TIRE CHOCK

This is a continuation, of application Ser. No. 552,856, filed Feb. 25, 1975 now abandoned.

BACKGROUND OF THE INVENTION

Devices for preventing inadvertent movement of automobiles are well known. They are most frequently used when changing tires, either to replace a flat tire or when rotating tires to provide for even wear.

Probably the oldest, simplest and still most widely used device of this type is a simple triangular solid. When needed, it is wedged between the tire and the ground on the downhill side of a tire that is remote from the tire being removed and then the opposite end of the vehicle is raised on a jack. In many, if not most, situations such a wedge performs adequately, however, there are a significant number of occasions when it does not. For example, the simple triangular block has a tendency, when on an incline, to move away from the tire. It also has a tendency to be pushed by the wheel, thereby permitting some movement of the vehicle. Since the jacks normally furnished with automobiles are rather easily upset, it is important to prevent even small movement of the vehicle. In view of the dire consequences that are likely to ensure when the simple triangular solid does not function properly, even a relatively small percentage of such failures represents a severe drawback.

A number of devices have been designed with an eye toward overcoming the disadvantages of the simple triangular solid chock. Included among those are the devices covered by U.S. Pat. Nos. 3,297,111, 2,299,115, 2,797,774 and 1,894,439. Each of these, while representing in one respect or another an improvement over the basic triangular chock, still has certain disadvantages which render it not entirely satisfactory.

SUMMARY OF THE INVENTION

The present invention relates generally to the field of automobile accessories and more particularly to wheel chocks adapted to prevent rolling of a motor vehicle tire along a planar surface. The tire chocks to which this invention relates are designed primarily for use in connection with automobiles, trucks, buses and airplanes. Devices embodying the subject invention incorporate means for preventing the chock from slipping away from or being pushed by the tire.

Except when used on airplanes, tire chocks are generally considered to be emergency equipment and hence are needed very infrequently. Nevertheless, despite the infrequent need, a chock is generally carried in each vehicle at all times so that when needed, it is available. It is important, therefore, that it not take up very much storage space, that the mechanical construction be sufficiently simple so that there will be little if any need for periodic maintenance or functional testing and yet, when needed, it is easily deployed and used.

Additionally, the tire chock of this invention can be used with different size tires. Such flexibility is advantageous because of the frequency with which automobiles are replaced and because of the rapidity with which tire improvements lead to size and configuration changes.

The invention accordingly comprises the features of construction, combination of elements and arrangement of parts which will be exemplified in the apparatus hereinafter described, and the scope of the invention will be indicated in the claims.

BRIEF DESCRIPTION OF THE DRAWINGS

For a thorough understanding of the nature and features of the invention, reference should be had to the following detailed description taken in connection with the accompanying drawings in which.

In the drawings, like reference numerals have been employed to refer to like parts throughout.

DETAILED DESCRIPTION OF PREFERRED EMBODIMENT

Figure 1:
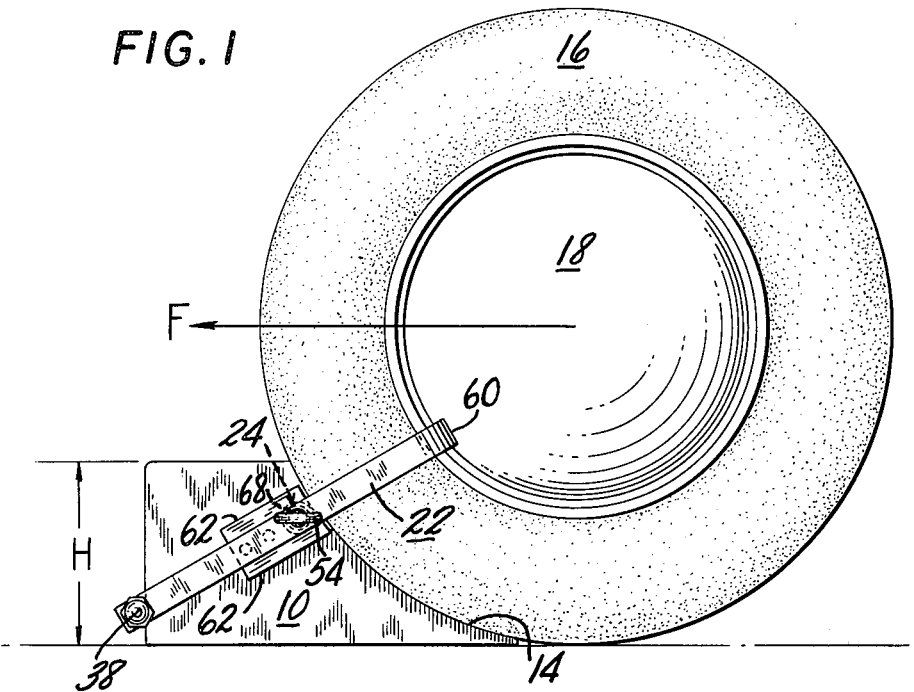
FIG. 1 is a side view of a device embodying the subject invention secured to a tire.
Figure 2:
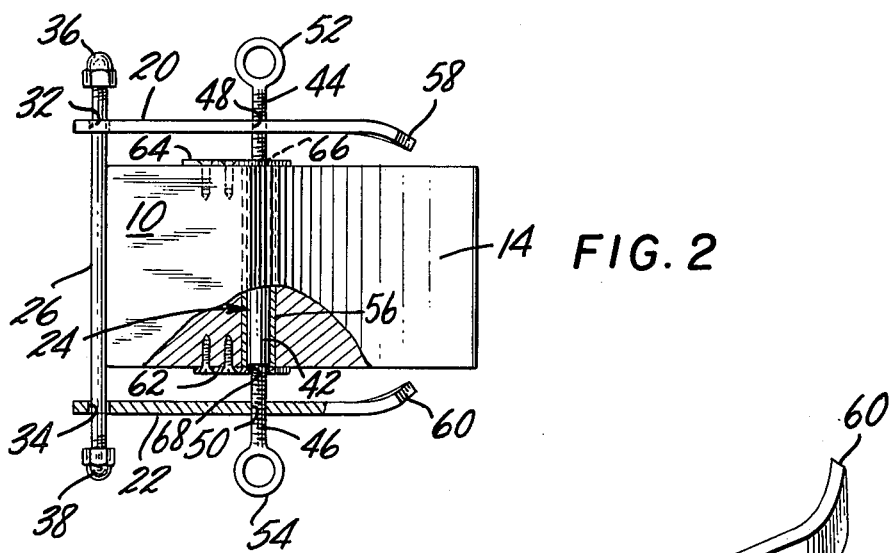
FIG. 2 is a top view of the device depicted in FIG. 1 without the tire.
Figure 3:
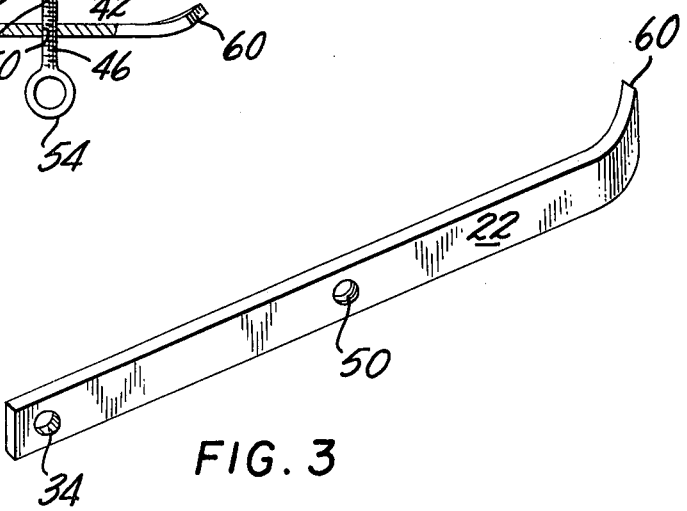
FIG. 3 is a perspective view of one of the gripping arms.

As shown in FIG. 1 the device of the subject invention is composed of two major components, a base and a frame. The base, denoted generally by the numeral 10, is preferably made as a wooden solid but can be made of any suitably rigid material. It also can be made as a rigid skeletal structure, the components of which would correspond generally to the intersections of faces which form the outlines of the base shown in the drawing. The portion of the base remote from the tire may conform to any suitable configuration but is most conveniently a rectangular solid. Although the wheel-engaging terminus of the chock, face 14, can be a planar surface, it is preferably formed with a concave curvature approximating the configuration of tire 16. In FIG. 1, tire 16 is mounted on wheel 18 and the device of the present invention is depicted in operative engagement with tire 16 to prevent the latter from rolling in the direction of arrow F. Height, H, of the base is not critical, so long as it is large enough to prevent the tire from rolling over it under normal conditions.

The frame component is comprised of two arms 20 and 22, an anchor rod 26 and an adjusting rod 24. Anchor rod 26 passes through apertures 32 and 34 in the proximal ends of arms 20 and 22 respectively. At its ends, anchor rod 26 is provided with stops 36 and 38 to prevent withdrawal of arms 20 and 22. There are wide variety of means well known in the art whereby enlarged shoulders are created to prevent such withdrawal. For example, a cap nut can be threaded onto each end as shown in the drawing. Alternatively, a hole can be provided at each end to accept a cotter pin or the end of the rod can be formed into an eyelet shape.

Arms 20 and 22 can be fashioned of standard flat bar stock, for example, bar stock having a rectangular cross section. Apertures 32 and 34 in the proximal ends of the arms are of sufficiently large diameter to accomodate anchor rod 26 but not of sufficient size to permit passage of stops 36 and 38 therethrough. Intermediate their ends, arms 20 and 22 are provided with internally threaded apertures 48 and 50 respectively. The internal threads of apertures 48 and 50 are of opposite hand.

Adjustment rod 24 has a center portion 42 of greater diameter than that of the two threaded end portions 44 and 46. The length of center portion 42 is approximately the same as or slightly less than the width of base 10 so that portion 42 can be retained wholly within base passage 56. Thread 46 on rod 24 engages the internal thread in aperture 50 of arm 22 and thread 44 on rod 24 engages the internal thread in aperture 48 of arm 20.

The ends of adjusting rod 24 are also furnished with enlarged eyelets 52 and 54 to facilitate rotation of the rod and to prevent disengagement of the complimentary threads and removal therefrom of the arms. Rod 24 passes through and its enlarged center section is rotatable within passage 56 in base 10. The distal ends 58 and 60 of rods 20 and 22 respectively curve inwardly toward each other.

Secured to the two sides of base 10 are keeper bars 62 and 64. The keeper bars 62 and 64 are provided with apertures 66 and 68 respectively, and are mounted on base 10 with the axes of apertures 66 and 68 aligned with the axis of passage 56. The keeper bar apertures are sufficient diameter to permit rotation therein of the reduced diameter ends of adjusting rod 24, but are too small to permit passage therethrough of the enlarged center portion 42 of adjusting rod 24. In this way, keepers 62 and 64 prevent substantial axial movement of the adjusting rod 24 with respect to base 10.

In order to make use of the device illustrated herein, rod 24 is rotated by means of eyelets 52 and 54 until ends 58 and 60 of arms 20 and 22 are far enough apart so that tire 16 can fit therebetween. Base 10 is then moved into position on the downhill side of tire 16 so that face 14 abuts the outer circumference of tire 16. The frame is rotated within passage 56 about the axis of rod 24 so that arms 20 and 22 aim approximately toward the center of wheel 18. Eyelets 52 and 54 are then rotated until arms 20 and 22 securely grip tire 16 or wheel 18. The gripping action of the arms prevents accidental removal of the base from contact with the wheel and also prevents rotation of the wheel with respect to the base. Thus, the base cannot slide away from the tire accidentally nor can the tire, by rotation, push the base in front of it.

As can be seen from the drawings, the device of this invention is readily adjustable to accommodate different sizes of tire. Rotation of adjusting rod 24 causes arms 20 and 22 to move toward or away from one another, depending upon the direction of rotation. Because of the substantial axial freedom of the proximal ends of arms 20 and 22 along anchor rod 26, the two arms will remain substantially parallel despite rotation of adjusting rod 24.

It will be readily apparent to those skilled in the art, from the foregoing description, that rotation of adjusting rod 24 serves dual functions. It causes arms 20 and 22 to grip or release (depending upon the direction of rotation) the tire. It also functions to adjust the device of this invention in order that it may accommodate tires of different sizes.

From the above description it can be seen that the device of the subject invention is extremely simple, hence easy to fabricate, cheap to build, requires virtually no maintenance and uses up very little storage space. Additional advantages, as will be apparent from the preceding description, inhere in the subject invention. Since certain changes may be made in the apparatus of the embodiment described above without departing from the scope of the invention, it is intended that all matter contained in the above description or shown in the accompanying drawings shall be interpreted as illustrative and not in a limiting sense. 9n Having described my invention, what I claim as new and desire to secure by letters patent is the novel subject matter defined in the following claims:

1. A wheel chock for preventing inadvertent movement of a wheel rotatably mounted on an axis comprising:
   a. a base member having a wheel-engaging element for engaging the circumferential periphery of said wheel and being of sufficient height to prevent wheel rotation about said axis;
   b. a frame mounted on said base member comprising at least two releasable gripping arms, an adjusting rod, means for movably securing said arms to said rod; and gripping arms anchoring means;
   said adjusting rod being disposed at a greater distance from said axis than the circumferential periphery of said wheel and being essentially parallel to the axis of said wheel when said wheel engaging element is abutting the outer circumference of said wheel; each of said gripping arms having a proximal end and a distal end; said gripping arms extending radially inwardly of the circumferential periphery of said wheel in unsupported and unconnected embrace of said wheel at opposite sides thereof when said wheel-engaging element is abutting the outer circumference of said wheel; said distal ends extending beyond said wheel-engaging element toward the axis of said wheel when said wheel-engaging element is abutting the outer circumference of said wheel; said rod in cooperation with said securing means being adapted to alter the separation between said distal ends of said arms for the purposes of engaging and disengaging said wheel; and said proximal ends of said gripping arms being axially movable with respect to each other whereby the separation between said proximal ends is variable to permit adjustment of said frame to accommodate different sizes of tire.

2. The wheel chock of claim 1 wherein said base is a solid block of rigid material and said wheel-engaging element is a face of said block.

3. The wheel chock of claim 2 wherein said anchoring means comprises
   a. an anchor rod essentially parallel to said adjusting rod; and
   b. means for moveably securing said gripping arms to said anchor rod.

4. The wheel chock of claim 3 wherein said adjusting rod is located between said anchor rod and said wheel axis.

5. The wheel chock of claim 2 wherein means are provided for rotating said adjusting rod and wherein said adjusting rod securing means comprises:
   a. external threads of opposite hand on the ends of said rod; and
   b. an internally threaded aperture through each of said arms engaging said external threads on said adjusting rod.

6. The wheel chock of claim 3 wherein means are provided for rotating said adjusting rod and wherein said adjusting rod securing means comprises:
   a. external threads of opposite hand on the ends of said adjusting rod; and
   b. an internally threaded aperture through each of said arms engaging said external threads on said adjusting rod;

7. The wheel chock of claim 6 wherein said anchor rod securing means comprises:

a. an aperture through the proximal end of each of said arms, of a diameter greater than the external diameter of said anchor rod; and
b. enlarged shoulder means at the extremities of said anchor rod to prevent withdrawal of said anchor rod extremities from said proximal-end arm apertures.

8. The wheel chock of claim 2 wherein said distal ends of said arms are shaped to engage said wheel when said ends approach each other and to prevent retraction of said wheel from said wheel-engaging face when said distal ends engage said wheel.

9. The wheel chock of claim 2 wherein said wheel-engaging face has a concave curvature.

10. The wheel chock of claim 6 wherein:
a. said base block has a passage therethrough;
b. said adjusting rod passes through and is rotatable within said base block passage; and
c. keeper means are provided to prevent withdrawal of said adjustment rod from said base block.

11. The wheel chock of claim 10 wherein said keeper means comprises:
a. an enlarged diameter center portion of said adjusting rod intermediate said threaded end portions; and
b. retainer bars having apertures therethrough of diameter intermediate between said adjusting rod center section diameter and said threaded end portions diameter secured to said base block so that said retainer bar apertures are coaxial with said base block passage.

* * * * *